US012133298B2

(12) United States Patent
Tucker et al.

(10) Patent No.: US 12,133,298 B2
(45) Date of Patent: Oct. 29, 2024

(54) ELECTRONIC VAPING DEVICE

(71) Applicant: Altria Client Services LLC, Richmond, VA (US)

(72) Inventors: Christopher S. Tucker, Midlothian, VA (US); Barry S. Smith, Hopewell, VA (US); Charles Dendy, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/517,595

(22) Filed: Nov. 22, 2023

(65) Prior Publication Data

US 2024/0098851 A1 Mar. 21, 2024

Related U.S. Application Data

(60) Continuation of application No. 17/675,259, filed on Feb. 18, 2022, now Pat. No. 11,838,996, which is a continuation of application No. 16/284,061, filed on Feb. 25, 2019, now Pat. No. 11,259,369, which is a division of application No. 15/076,799, filed on Mar. 22, 2016, now Pat. No. 10,251,424.

(51) Int. Cl.

| | |
|---|---|
| ***H05B 3/42*** | (2006.01) |
| ***A24F 40/10*** | (2020.01) |
| ***A24F 40/46*** | (2020.01) |

(52) U.S. Cl.

CPC ............... *H05B 3/42* (2013.01); *A24F 40/46* (2020.01); *A24F 40/10* (2020.01); *H05B 2203/014* (2013.01)

(58) Field of Classification Search

CPC ..... H05B 3/42; H05B 2203/014; A24F 40/46; A24F 40/10

See application file for complete search history.

(56) References Cited

U.S. PATENT DOCUMENTS 8,156,944 B2 4/2012 Han
8,365,742 B2 2/2013 Hon
(Continued)

FOREIGN PATENT DOCUMENTS

CN 101843368 A 9/2010
CN 201750712 U 2/2011
(Continued)

OTHER PUBLICATIONS

International Search Report and Written Opinion with corresponding International Application No. PCT/EP2017/056795 dated Jun. 2, 2017.

(Continued)

*Primary Examiner* — Thien S Tran
(74) *Attorney, Agent, or Firm* — Harness, Dickey & Pierce, P.L.C.

(57) ABSTRACT

A heater assembly for an electronic vaping device and a method of manufacturing the electronic vaping device are provided. The heater assembly includes a chimney cage extending longitudinally, a heater extending longitudinally within the chimney cage, a heater gauze positioned about an outer circumference of the heater, the chimney case positioned about an outer circumference of the heater gauze, and a cathode clip electrically connected to a first end portion of the heater.

17 Claims, 17 Drawing Sheets

(56) References Cited

U.S. PATENT DOCUMENTS

| | | | | |
|---|---|---|---|---|
| 8,689,805 | B2 | 4/2014 | Hon | |
| 9,326,547 | B2 | 5/2016 | Tucker et al. | |
| 2009/0095311 | A1* | 4/2009 | Han | H05B 3/06 131/194 |
| 2009/0272379 | A1 | 11/2009 | Thorens et al. | |
| 2010/0307518 | A1 | 12/2010 | Wang | |
| 2011/0126848 | A1 | 6/2011 | Zuber et al. | |
| 2011/0147486 | A1 | 6/2011 | Greim et al. | |
| 2011/0209717 | A1 | 9/2011 | Han | |
| 2013/0192623 | A1 | 1/2013 | Tucker et al. | |
| 2013/0037041 | A1 | 2/2013 | Worm et al. | |
| 2013/0192621 | A1 | 8/2013 | Li et al. | |
| 2013/0213419 | A1 | 8/2013 | Tucker et al. | |
| 2014/0109921 | A1 | 4/2014 | Chen | |
| 2014/0190478 | A1* | 7/2014 | Liu | A24F 40/44 128/202.21 |
| 2014/0196716 | A1* | 7/2014 | Liu | A24F 40/46 128/202.21 |
| 2014/0196733 | A1 | 7/2014 | Liu | |
| 2014/0238422 | A1 | 8/2014 | Plunkett et al. | |
| 2014/0238423 | A1 | 8/2014 | Tucker et al. | |
| 2014/0238424 | A1 | 8/2014 | Macko et al. | |
| 2014/0305454 | A1 | 10/2014 | Rinker et al. | |
| 2015/0181937 | A1* | 7/2015 | Dubief | A61M 15/06 131/329 |
| 2015/0272218 | A1 | 10/2015 | Chen | |
| 2015/0289565 | A1 | 10/2015 | Cadieux et al. | |
| 2018/0011940 | A1 | 1/2018 | Moon | |
| 2018/0027879 | A1 | 2/2018 | Gavrielov et al. | |

FOREIGN PATENT DOCUMENTS

| | | | |
|---|---|---|---|
| CN | 202122097 | U | 1/2012 |
| CN | 102655773 | A | 9/2012 |
| CN | 203194538 | U | 9/2013 |
| CN | 203329913 | U | 12/2013 |
| CN | 203523811 | U | 4/2014 |
| CN | 103948174 | A | 7/2014 |
| CN | 103960782 | A | 8/2014 |
| CN | 103974639 | A | 8/2014 |
| CN | 203762287 | U | 8/2014 |
| CN | 203828070 | U | 9/2014 |
| CN | 203851809 | U | 10/2014 |
| CN | 204032367 | U | 12/2014 |
| CN | 104284606 | A | 1/2015 |
| CN | 204104827 | U | 1/2015 |
| CN | 104540404 | A | 4/2015 |
| CN | 104602553 | A | 5/2015 |
| CN | 204426699 | U | 7/2015 |
| CN | 204426704 | U | 7/2015 |
| CN | 204483023 | U | 7/2015 |
| CN | 104886783 | A | 9/2015 |
| CN | 204653779 | U | 9/2015 |
| CN | 105163614 | A | 12/2015 |
| CN | 204861180 | U | 12/2015 |
| CN | 204907931 | U | 12/2015 |
| CN | 204907932 | U | 12/2015 |
| CN | 105342016 | A | 2/2016 |
| CN | 105357995 | A | 2/2016 |
| EP | 0503767 | A1 | 9/1992 |
| EP | 2574247 | A1 | 4/2013 |
| EP | 2787846 | A1 | 10/2014 |
| ES | 1070375 | U | 8/2009 |
| GB | 1083761 | A | 9/1967 |
| KR | 10-2014-0109368 | A | 9/2014 |
| WO | WO-2013/083631 | A1 | 6/2013 |
| WO | WO-2014/110740 | A1 | 7/2014 |
| WO | WO-2014107837 | A1 | 7/2014 |
| WO | WO-2014110712 | A1 | 7/2014 |

OTHER PUBLICATIONS

Russian Notice of Allowance and Search Report for corresponding Application No. 2018136871, dated May 25, 2020.
Chinese Office Action dated Nov. 26, 2020 for corresponding Chinese Application No. 201780013951.4, and English-language translation thereof.
Office Action dated Mar. 15, 2021 issued in corresponding Japanese Patent Application No. 2018-549945.
Chinese Office Action dated Jul. 6, 2021 for corresponding Chinese Application No. 201780013951.4.
Japanese Office Action dated Sep. 13, 2021 for corresponding Japanese Application No. 2018-549945, and English-language translation thereof.
Office Action for Korean Application No. 10-2018-7026019 dated Nov. 17, 2021.
Decision to Grant dated Apr. 6, 2022 issued in corresponding Japanese patent application No. 2018-549945.
Korean Notice of Allowance dated May 25, 2022 for corresponding Korean Application No. 10-2018-7026019, and English-language translation thereof.

* cited by examiner

ELECTRONIC VAPING DEVICE

This application is a continuation of U.S. application Ser. No. 17/675,259, filed Feb. 18, 2022, which is a continuation of U.S. application Ser. No. 16/284,061, filed Feb. 25, 2019, which is a divisional application of U.S. application Ser. No. 15/076,799, filed Mar. 22, 2016, the entire contents of each of which are incorporated herein by reference.

BACKGROUND

Field

The present disclosure relates to a heater assembly for an electronic vaping device and a method of making the electronic vaping device.

Description of Related Art

An electronic vaping device includes a heater element which vaporizes a pre-vapor formulation to produce a "vapor." The heater element may include a resistive heater coil, with a wick extending therethrough.

SUMMARY

At least one example embodiment relates to a heater assembly for an electronic vaping device.

In at least one example embodiment, a heater assembly includes a chimney cage extending longitudinally, a heater extending longitudinally within the chimney cage, a heater gauze positioned about an outer circumference of the heater, and a cathode clip electrically connected to a first end portion of the heater. The chimney case is positioned about an outer circumference of the heater gauze.

In at least one example embodiment, the heater is a coil heater. The heater assembly may also include a chimney cage cap. The chimney cage cap may include a generally disc-shaped base, a cylindrical, longitudinally extending first tube including a slot in a first end of the first tube, the slot configured to receive a first end portion of the heater, and a cylindrical, longitudinally extending second tube configured to contact a first end of the chimney cage.

In at least one example embodiment, the cathode clip includes at least one arm. The at least one arm may extend away from the heater assembly and/or the at least one arm may extend towards the heater assembly.

In at least one example embodiment, a cartridge (first section) of an electronic vaping device is provided. The cartridge includes a heater assembly, a reservoir, and a housing. The heater assembly includes a chimney cage extending longitudinally, a heater extending longitudinally within the chimney cage, a heater gauze positioned about an outer circumference of the heater, the chimney case positioned about an outer circumference of the heater gauze, and a cathode clip configured to contact a first end portion of the heater and form an electrical connection therewith. The reservoir is configured to contain a pre-vapor formulation. The reservoir includes at least one layer of gauze circumscribing the chimney cage. The reservoir is positioned between the heater assembly and an inner surface of the housing.

In at least one example embodiment, the heater is a coil heater. The cartridge may also include a chimney cage cap. The chimney cage cap may include a generally disc-shaped base, a cylindrical, longitudinally extending first tube including a slot in a first end of the first tube, the slot configured to receive a first end portion of the coil heater, and a cylindrical, longitudinally extending second tube configured to contact a first end of the chimney cage. The cathode clip includes at least one arm, the arm configured to contact the housing. The at least one arm may extend away from the heater assembly and may contact the housing. In at least one example embodiment, the at least one arm may extend between the at least one layer of gauze and the housing, such that the at least one arm contacts the housing.

In at least one example embodiment, an electronic vaping device is provided. The electronic vaping device includes a cartridge. The cartridge includes a heater assembly. The heater assembly includes a chimney cage extending longitudinally, a heater extending longitudinally within the chimney cage, a heater gauze positioned about an outer circumference of the heater, the chimney case positioned about an outer circumference of the heater gauze, and a cathode clip configured to contact a first end portion of the heater and form an electrical connection therewith. The cartridge also includes a reservoir configured to contain a pre-vapor formulation. The reservoir includes at least one layer of gauze circumscribing the chimney cage. The cartridge also includes a housing. The reservoir is positioned between the heater assembly and an inner surface of the housing.

In at least one example embodiment, the electronic vaping device also includes a battery section. The battery section includes a battery, a controller, and a sensor. The heater is a coil heater. The electronic vaping device may also include a chimney cage cap. The chimney cage cap may include a generally disc-shaped base, a cylindrical, longitudinally extending first tube including a slot in a first end of the first tube, the slot configured to receive a first end portion of the coil heater, and a cylindrical, longitudinally extending second tube configured to contact a first end of the chimney cage.

In at least one example embodiment, the cathode clip includes at least one arm. The arm is configured to contact the housing. The at least one arm may extend away from the heater assembly and contacts the housing. The at least one arm may extend towards the heater assembly and between the at least one layer of gauze and the housing, such that the at least one arm contacts the housing.

In at least one example embodiment, a method for automated manufacture of a cartridge of an electronic vaping device is provided. The method includes contacting a cathode clip including at least one arm with a first electrical lead extending from a heater, inserting a first mandrel in a first end of the heater, inserting a second mandrel in a second end of the heater, wrapping a gauze material around the heater to form a wrapped heater, and sliding a chimney cage over the wrapped heater to form a heater assembly. The method may also include wrapping at least one layer of gauze material about the heater assembly to form a wrapped heater assembly. The method may further include folding the at least one arm, such that the at least one arm extends away from the wrapped heater assembly and/or folding the at least one arm, such that the at least one arm extends towards the wrapped heater assembly. In at least one example embodiment, the method includes sliding a housing over the wrapped heater assembly. The method may also include removing the first mandrel, removing the second mandrel, and inserting a second connector in a second end of the wrapped heater assembly. In at least one example embodiment, the method may include injecting a pre-vapor formulation onto the at least one layer of gauze material and/or inserting a mouth-end insert in a first end of the housing. In at least one example embodiment, the method may include threading the first electrical lead through a chimney cage cap, positioning the cathode clip on the chimney cage cap, and/or welding the first electrical lead to the cathode clip.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
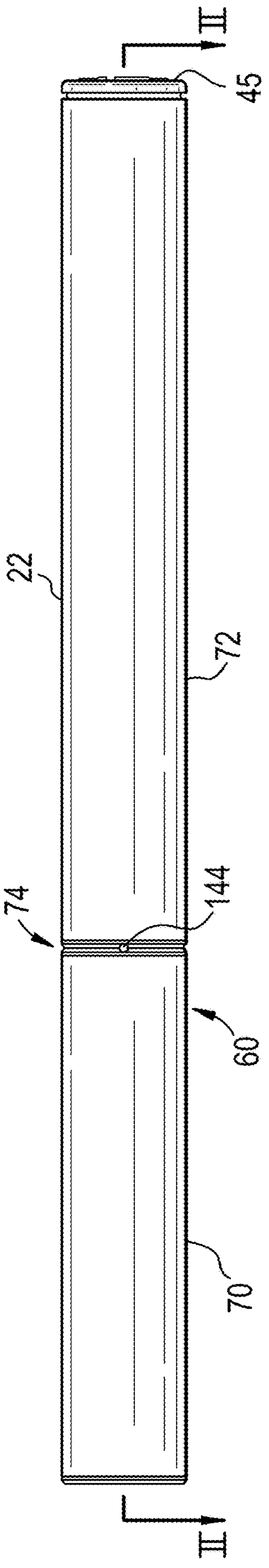
FIG. 1 is a side view of an electronic vaping device according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In at least one example embodiment, as shown in FIG. 1, the electronic vaping device 60 may include a replaceable cartridge (or first section) 70 and a reusable battery section (or second section) 72, which may be coupled together at a connector 74, which may be a threaded connector.

In at least one example embodiment, the connector 74 may be any type of connector, such as a snug-fit, detent, clamp, bayonet, and/or clasp. The second section 72 may include a sensor 16 responsive to air drawn into the second section 72, a power supply 11, and a control circuit 11.

In at least one example embodiment, the first section 70 may include an outer housing 22' extending in a longitudinal direction. The second section 70 may include an outer housing 22 that also extends in the longitudinal direction.

In at least one example embodiment, the first section 70 includes a reservoir 122 that contains a pre-vapor formulation. The first section 70 may also include a heater 36 that is configured to vaporize the pre-vapor formulation. The electronic vaping device 60 may include additional features as set forth in U.S. Patent Application Publication No. 2013/0192623 to Tucker et al. filed Jan. 31, 2013, the entire content of which is incorporated herein by reference thereto.

The pre-vapor formulation may be a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers, such as glycerin and propylene glycol.

Upon completing the connection between the first section 70 and the second section 72, the power supply 12 may be electrically connectable with the heater 36 of the first section 70 upon actuation of the sensor 16. Air is drawn primarily into the first section 70 through one or more air inlets 144, which may be located along the housing 22, 22' or at the connector 74.

The outer housing 22, 22' may have a generally cylindrical cross-section. In at least one example embodiment, the outer housing 22, 22' may have a generally triangular cross-section or square cross-section. In at least one example embodiment, the housing 22, 22' may have a greater circumference or dimensions at the tip end than at a mouth-end of the electronic vaping device 60 or vice versa. In at least one example embodiment, the housing 22, 22' is a single, unitary housing. In other example embodiments, the housing 22, 22' may include two or more pieces.

Figure 2:
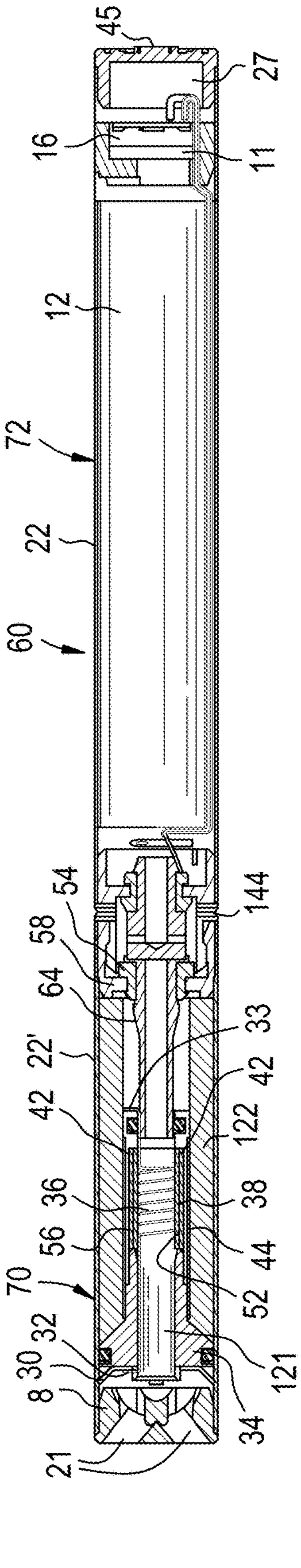
FIG. 2 is a cross-sectional view along line II-II of the electronic vaping device of FIG. 1.

In at least one example embodiment, as shown in FIG. 2, the electronic vaping device 60 includes a mouth-end insert 8 configured to be inserted in an open, mouth-end of the housing 22'. The mouth-end insert 8 may include at least one outlet 21. In some example embodiments, the mouth-end insert 8 may include two or more outlets 21 that are angled outwardly with respect to the longitudinal axis of the electronic vaping device 60.

Figure 3:
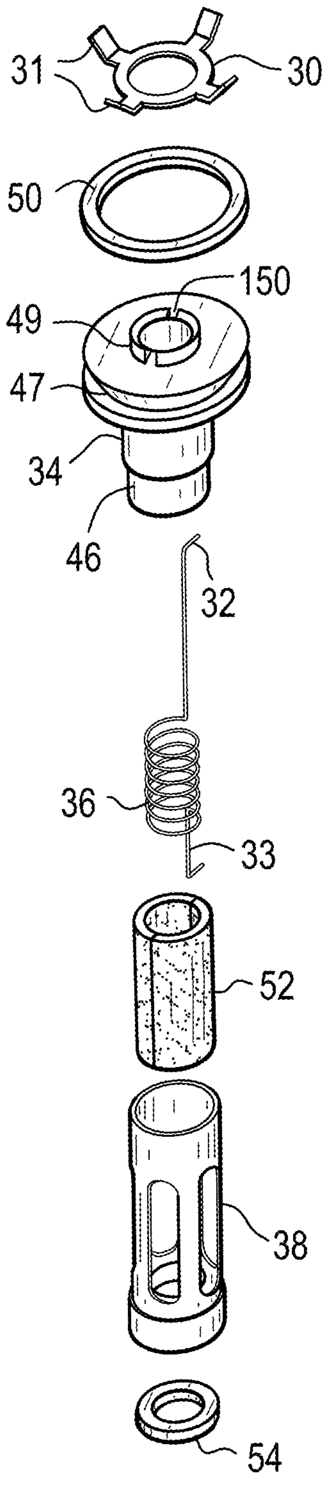
FIG. 3 is an exploded view of a heater assembly according to at least one example embodiment.
Figure 4:
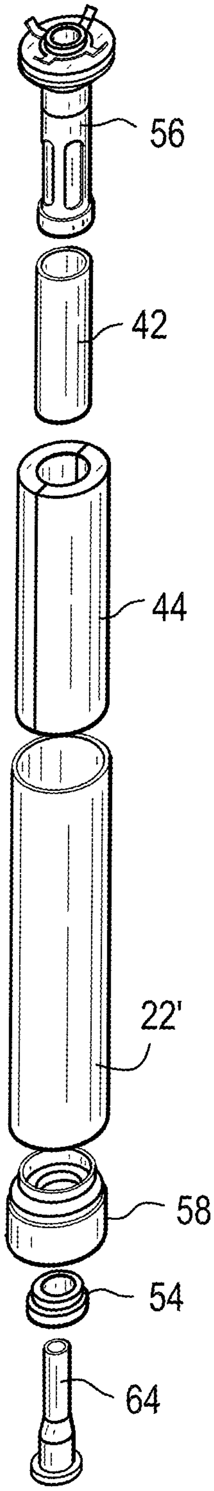
FIG. 4 is an exploded view of a cartridge according to at least one example embodiment.

As shown in FIG. 2, in at least one example embodiment, the first section 22' houses a heater assembly 56. As shown in FIGS. 2, 3, and 4, the heater assembly 56 may include a chimney cage 38 extending in the longitudinal direction. The heater 36 may extend longitudinally within the chimney cage 38. A heater gauze 52, such as a gauze wrap, may be positioned and/or wrapped about an outer circumference of the heater 36. The chimney cage 38 is positioned about and/or fully or partially surrounds an outer circumference of the heater gauze 52. An inner gauze 42 and an outer gauze 44 may surround and/or be wrapped entirely or partially about an outer circumference of the chimney cage 38. The inner gauze 42 and the outer gauze 44 are configured to hold the pre-vapor formulation.

In at least one example embodiment, an air passage 121 extends through the heater assembly 56. The air passage 121 extends in the longitudinal direction and allows air to flow through the heater assembly 121 from the air inlets 144 to the outlets 21. The air passage 121 may extend through the heater 36, such that air flowing through the air passage mixes with vapor formed at the heater 36 and flows with the vapor to the outlets 21 of the mouth-end insert 8.

In at least one example embodiment, the heater assembly 56 is inserted in the housing 22'. An annular space between an inner surface of the housing 22' and the chimney cage 38 forms a reservoir 122 that contains the pre-vapor formulation. The inner gauze 42 and/or the outer gauze 44 are wrapped around the chimney cage 38 and are positioned in the reservoir 122. The inner gauze 42 and outer gauze 44 and the gauze wrapping 52 hold and/or wick the pre-vapor formulation from the reservoir 122 to the heater 36. The inner gauze 42 and/or the outer gauze 44 may help reduce and/or minimize leakage of the pre-vapor formulation from the reservoir 122.

In at least one example embodiment, a cathode clip 30 is electrically connected to the heater 36. The cathode clip 30 may include at least one arm 31. As shown in FIGS. 3-4, the cathode clip 30 may include four arms 31. The at least one arm 31 is configured to contact the inner surface of the housing 22' when the cartridge is assembled. The at least one arm 31 may extend towards and/or away from the heater assembly 56, and a length of the at least one arm 31 may vary and may be chosen to ensure contact with the inner surface of the outer housing 22'.

Figure 5:
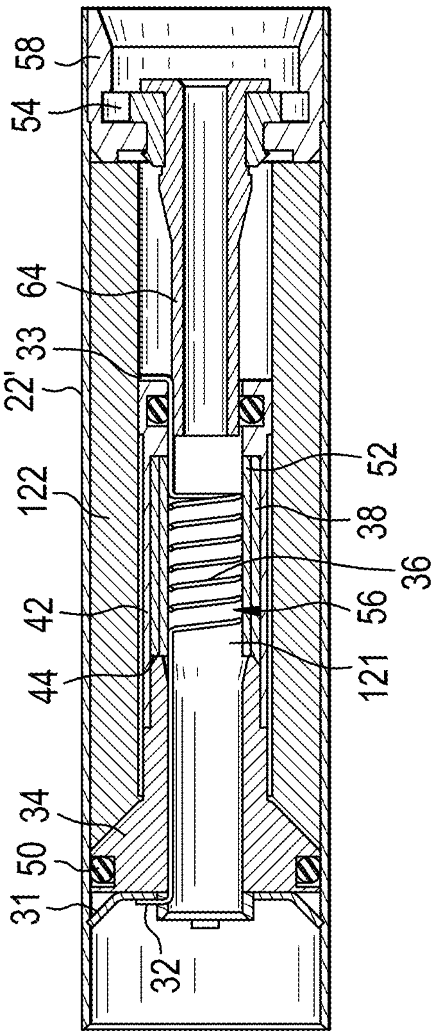
FIG. 5 is a cross-sectional view of a cartridge according to at least one example embodiment.

In at least one example embodiment, as shown in FIG. 5, the heater assembly 56 may also include a chimney cage cap 34 that is positioned at a first end of the heater assembly 56. The chimney cage cap 34 is configured to substantially prevent and/or reduce leakage of the pre-vapor formulation from the reservoir 122. In at least one example embodiment, a gasket 50 may surround a portion of the chimney cage cap 34. The gasket 50 reduces and/or minimizes leakage of the pre-vapor formulation from the reservoir 122.

In at least one example embodiment, the chimney cage cap 34 may include a base 47 that has a generally disc shape with a central hole extending there through. An outer edge of the base 47 may friction fit with an inner surface of the outer housing 22'. The chimney cage cap 34 may also include a first tube 49 and a second tube 46. Holes extending through the first tube 49 and the second tube 46 may align with the central hole in the base 47 such that air and/or vapor may flow through the chimney cage cap 34. The first tube 49 and the second tube 46 are generally cylindrical in cross-section. The first tube 49 and the second tube 46 extend longitudinally within the housing 22'. The first tube 49 may include a slot 150 in a first end of the first tube 49. The slot 150 is configured to receive a first end portion or electrical lead 32 of the heater 36. Once the first end portion or electrical lead 32 of the heater 36 is inserted in the slot 150, the electrical lead 32 contacts the cathode clip 30 to electrically connect the heater 36 to the power supply 12. The electrical lead 32 may be spot welded to the cathode clip 30 if desired. The second tube 46 may be configured to contact a first end of the chimney cage 38.

Figure 8:
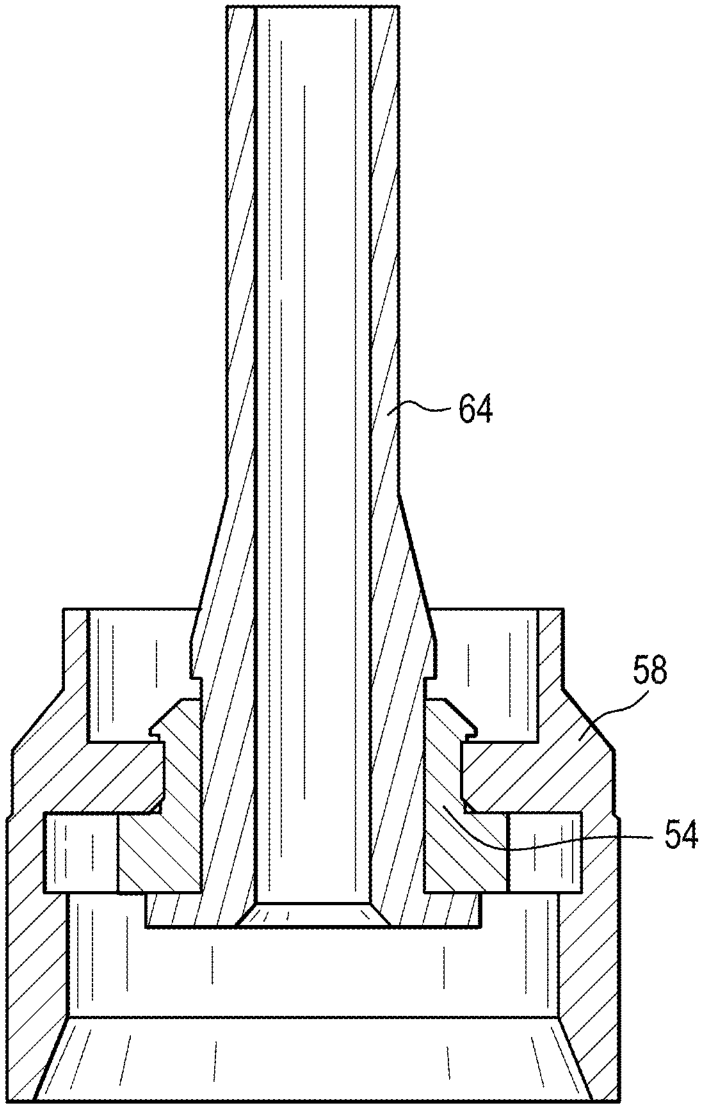
FIG. 8 is an illustration of a connector for a cartridge according to at least one example embodiment.

In at least one example embodiment, as shown in FIGS. 4 and 8, at a second end of the heater assembly 56, a nose portion of an anode 64 extends through an anode gasket 54 and a cathode connector 58. A second portion or electrical lead 33 extending from the heater 36 may be in contact with and/or welded to the anode so as to electrically connect the heater 36 and the power supply 12. The cathode connector 58 may include a threaded section for effecting the connection between the first section 70 and the battery section 72.

In at least one example embodiment, the anode gasket 54 may seal a second end of the reservoir 122 so as to reduce and/or prevent leakage of the pre-vapor formulation from the reservoir 122. In at least one example embodiment, an outer perimeter of the gasket 54 may provide a seal with an interior surface of the outer housing 22'. The gasket 54 may surround a portion of the cathode connector 58 and the anode 64.

In at least one example embodiment, as shown in FIG. 2, one or more air inlets 144 may be included in the outer housing 22, 22'. Alternatively, a single air inlet 144 may be included in the outer housing 22, 22'. The air inlets 144 may be placed adjacent to the connector 74 so as to prevent and/or reduce occlusion of the air inlets 144. In at least one example embodiment, the air inlets 144 may be provided in the connector 74.

As discussed above, in at least one example embodiment, the reservoir 122 may be contained in an outer annulus between the chimney cage 38 and an inner surface of the outer housing 22', and between the gasket 54 the chimney cage cap 34. Thus, the reservoir 22 may at least partially surround the inner passage 121.

In at least one example embodiment, the reservoir 122 may be sized and configured to hold enough pre-vapor formulation such that the electronic vaping device 60 may be configured for vaping for at least about 200 seconds. Moreover, the electronic vaping device 60 may be configured to allow each puff to last a maximum of about 5 seconds. In at least one example embodiment, the electronic vaping device 60 may be configured to adjust maximum puff length.

As discussed above, the gauze wrapping 52, the inner gauze 42, and/or the outer gauze 44 may contain and/or wick the pre-vapor formulation. Thus, the gauze wrapping 52, the inner gauze 42, and/or the outer gauze 44 may comprise a storage medium and/or a material that wicks the pre-vapor formulation. The storage medium may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section which has a Y-shape, cross shape, clover shape or any other suitable shape. A density of each of the gauze wrapping 52, the inner gauze 42, and/or the outer gauze 44 may be substantially the same or different. In at least one example embodiment, a thickness of each of the gauze wrapping 52, the inner gauze 42, and/or the outer gauze 44 may be substantially the same or different. In at least one example embodiment, the gauze wrapping 52 may be a shaped tube of fibrous material that has a self-sustaining shape.

During vaping, pre-vapor formulation may be transferred from the reservoir 122 and/or inner gauze 42 and outer gauze 44 to the proximity of the heater 36 via capillary action of the gauze wrapping 52.

In at least one example embodiment, the gauze wrapping 52 may include any suitable material or combination of materials. The gauze wrapping 52 may have any suitable capillarity drawing action to accommodate pre-vapor formulations having different physical properties such as density, viscosity, surface tension and vapor pressure.

In at least one example embodiment, the heater 36 may include a wire coil. The wire may be a metal wire and/or the heater coil may extend fully or partially along the length of the inner passage 121 and air may flow through a central portion of the coil during vaping.

The heater coil may be formed of any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heater 36 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heater 36 may include at least one material selected from the group consisting of stainless steel, copper, copper alloys, nickel-chromium alloys, super alloys and combinations thereof. In an example embodiment, the heater 36 may be formed of nickel-chromium alloys or iron-chromium alloys. In another example embodiment, the heater 36 may be a ceramic heater having an electrically resistive layer on an outside surface thereof.

The heater 36 may heat pre-vapor formulation in the gauze wrapping 52 by thermal conduction. Alternatively, heat from the heater 36 may be conducted to the pre-vapor formulation by means of a heat conductive element or the heater 36 may transfer heat to the incoming ambient air that is drawn through the electronic vaping device 60 during vaping, which in turn heats the pre-vapor formulation by convection.

The power supply 12 may include a battery arranged in the electronic vaping device 60. The power supply 12 may be a Lithium-ion battery or one of its variants, for example a Lithium-ion polymer battery. Alternatively, the power supply 12 may be a nickel-metal hydride battery, a nickel cadmium battery, a lithium-manganese battery, a lithium-cobalt battery or a fuel cell. The electronic vaping device 60 may be usable by an adult vaper until the energy in the power supply 12 is depleted or in the case of lithium polymer battery, a minimum voltage cut-off level is achieved.

Further, the power supply 12 may be rechargeable and may include circuitry configured to allow the battery to be chargeable by an external charging device. To recharge the electronic vaping device 60, an USB charger or other suitable charger assembly may be used.

In at least one example embodiment, the sensor 16 may be configured to sense an air pressure drop and initiate application of voltage from the power supply 12 to the heater 36. The control circuit 11 may also include a heater activation light 27 configured to glow when the heater 36 is activated. The heater activation light 27 may include an LED and may be at a second end of the electronic vaping device 60. Moreover, the heater activation light 27 may be arranged to be visible to an adult vaper during vaping. In addition, the heater activation light 27 may be utilized for e-vaping system diagnostics or to indicate that recharging is in progress. The heater activation light 27 may also be configured such that the adult vaper may activate and/or deactivate the heater activation light 27 for privacy. The heater activation light 27 may be on a tip end of the electronic vaping device 60 or on a side of the housing 22.

In at least one example embodiment, the control circuit 11 may supply power to the heater 36 responsive to the sensor 16. In at least one example embodiment, the control circuit 11 may include a maximum, time-period limiter. In another example embodiment, the control circuit 11 may include a manually operable switch for an adult vaper to initiate a puff. The time-period of the electric current supply to the heater

36 may be pre-set depending on the amount of pre-vapor formulation desired to be vaporized. In yet another example embodiment, the control circuit 11 may supply power to the heater 36 as long as the sensor 16 detects a pressure drop.

When activated, the heater 36 may heat a portion of the gauze wrapping 52 for less than about 10 seconds. Thus, the power cycle (or maximum puff length) may range in period from about 2 seconds to about 10 seconds (e.g., about 3 seconds to about 9 seconds, about 4 seconds to about 8 seconds or about 5 seconds to about 7 seconds).

In at least one example embodiment, the first section 70 may be replaceable. In other words, once the pre-vapor formulation is depleted, only the first section 70 may be replaced. In another example embodiment, the entire electronic vaping device 60 may be disposed once the reservoir 122 is depleted.

In at least one example embodiment, the power supply 12 may include a battery arranged in the electronic vaping device 60. The power supply 12 may be a Lithium-ion battery or one of its variants, for example a Lithium-ion polymer battery. Alternatively, the power supply 12 may be a nickel-metal hydride battery, a nickel cadmium battery, a lithium-manganese battery, a lithium-cobalt battery or a fuel cell. The electronic vaping device 60 may be usable by an adult vaper until the energy in the power supply 12 is depleted or in the case of lithium polymer battery, a minimum voltage cut-off level is achieved.

Further, the power supply 12 may be rechargeable and may include circuitry configured to allow the battery to be chargeable by an external charging device. To recharge the electronic vaping device 60, an USB charger or other suitable charger assembly may be used.

Further, the control circuit 11 may supply power to the heater 36 responsive to the sensor 16. In one example embodiment, the control circuit 11 may include a maximum, time-period limiter. In another example embodiment, the control circuit 11 may include a manually operable switch for an adult vaper to initiate a puff. The time-period of the electric current supply to the heater 36 may be pre-set depending on the amount of pre-vapor formulation desired to be vaporized. In yet another example embodiment, the control circuit 11 may supply power to the heater 36 as long as the sensor detects a pressure drop.

In an example embodiment, the electronic vaping device 60 may be about 80 mm to about 110 mm long and about 7 mm to about 8 mm in diameter. For example, in one example embodiment, the electronic vaping device 60 may be about 84 mm long and may have a diameter of about 7.8 mm.

In at least one example embodiment, not shown, the inner gauze 42 and the outer gauze 44 may be excluded from the electronic vaping device 60.

In at least one example embodiment, a method for automated manufacture of a cartridge of an electronic vaping device is provided. The method may result in a simplified device that reduces the complexity of manufacturing an electronic vaping device.

Figure 6A:
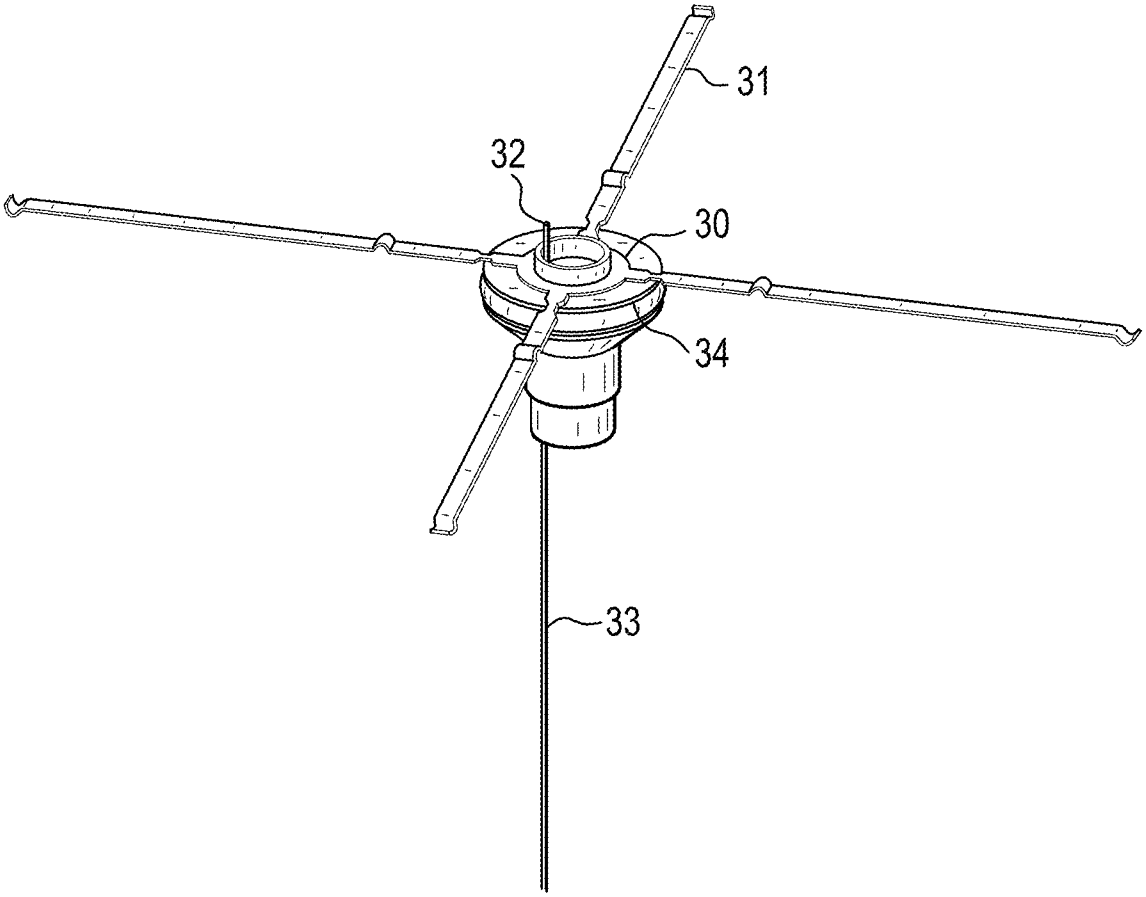
FIGS. 6A-6I illustrate a method of assembling a cartridge including a heater assembly according to at least one example embodiment.
Figure 6B:
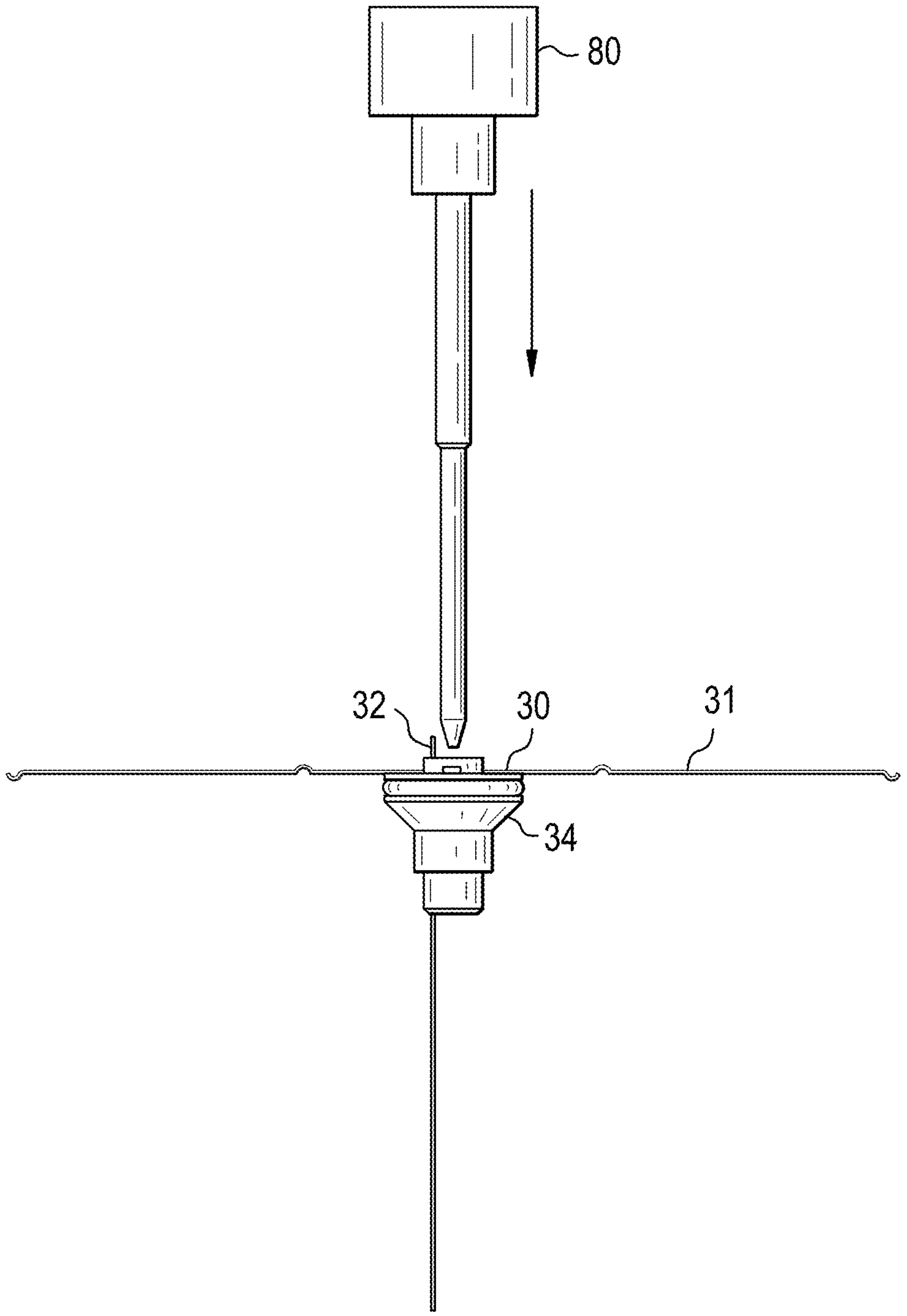
Figure 6C:
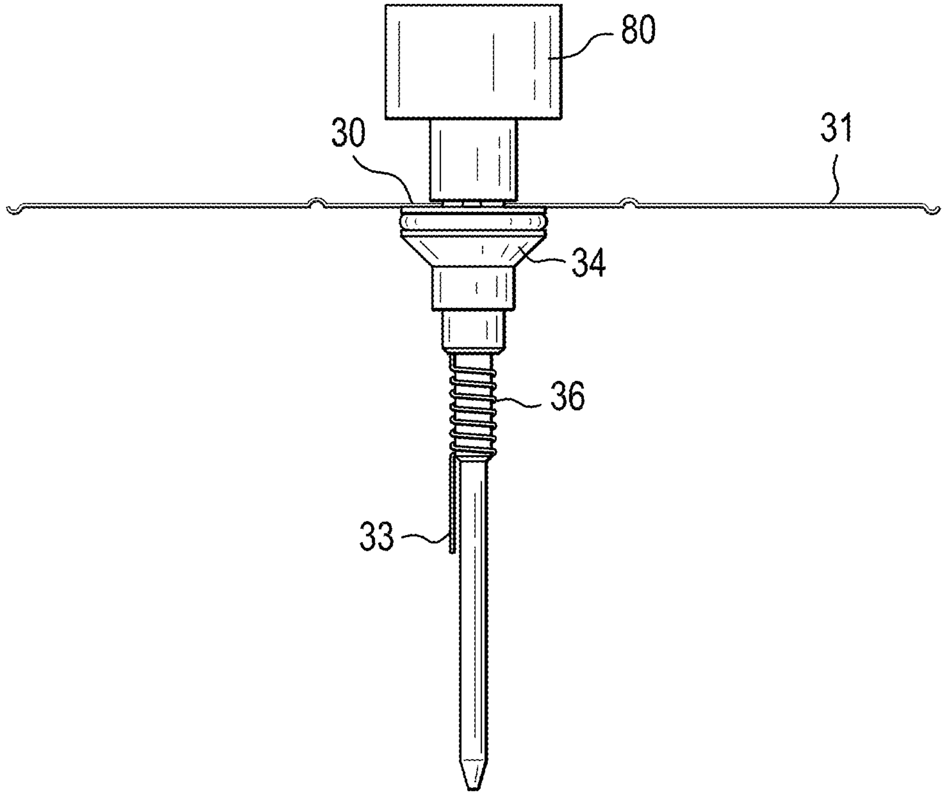

As shown in FIGS. 6A-6I, the method includes threading a first electrical lead 32 through a center of a chimney cage cap 34 and contacting the first electrical lead 32 with a cathode clip 30 including at least one arm 31. The method also includes inserting a first mandrel 80 through a center of the cathode clip 30 and through the center of the chimney cage cap 34. The method may include wrapping a heater coil around a stem of the first mandrel 80 as shown in FIG. 6C. The first mandrel 80 may include the stem portion that extends through the center of the heater 36 so as to maintain windings of the coil heater 36 in spaced apart relation, which may avoid and/or reduce hot spots during heating.

Figure 6D:
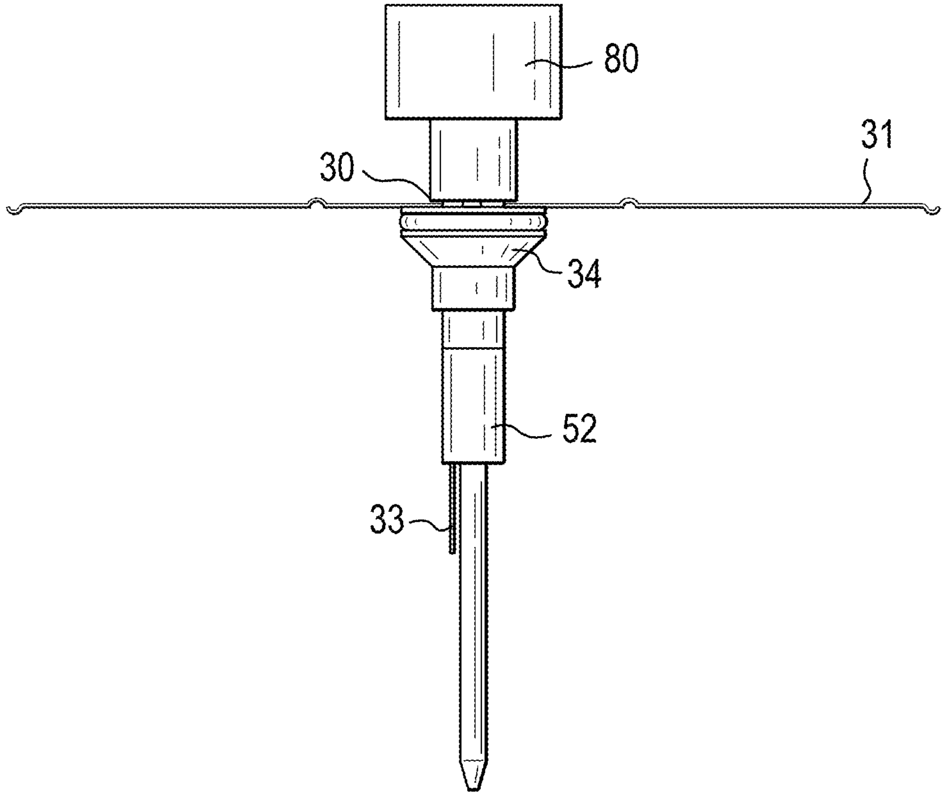
Figure 6E:
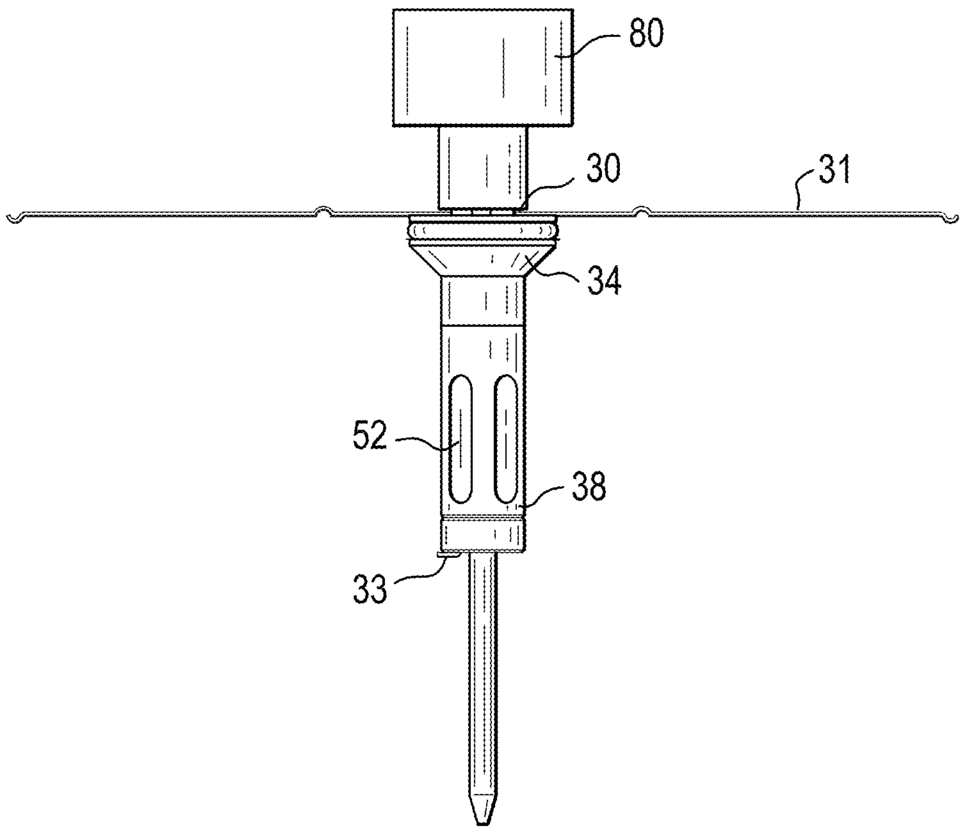

As shown in FIG. 6D, the method may further include wrapping a gauze material 52 around the heater 36 to form a wrapped heater. Once the heater 36 is wrapped, the method may include sliding a chimney cage 38 over the wrapped heater to form a heater assembly 56. The gauze material 52 may be wrapped tightly enough and secured around the heater 36 so that the chimney cage 38 slides over the wrapped heater.

In other example embodiments, a tongue or other implement may hold the gauze material 52 in place around the heater 36 while the chimney cage 38 is slid over the wrapper heater. The tongue may be withdrawn once the chimney cage 38 is in place. In another example embodiment, the chimney cage 38 could include a hinge mechanism (not shown) so that the chimney cage 38 is opened, positioned around the wrapped heater, and then secured there around.

Figure 6F:
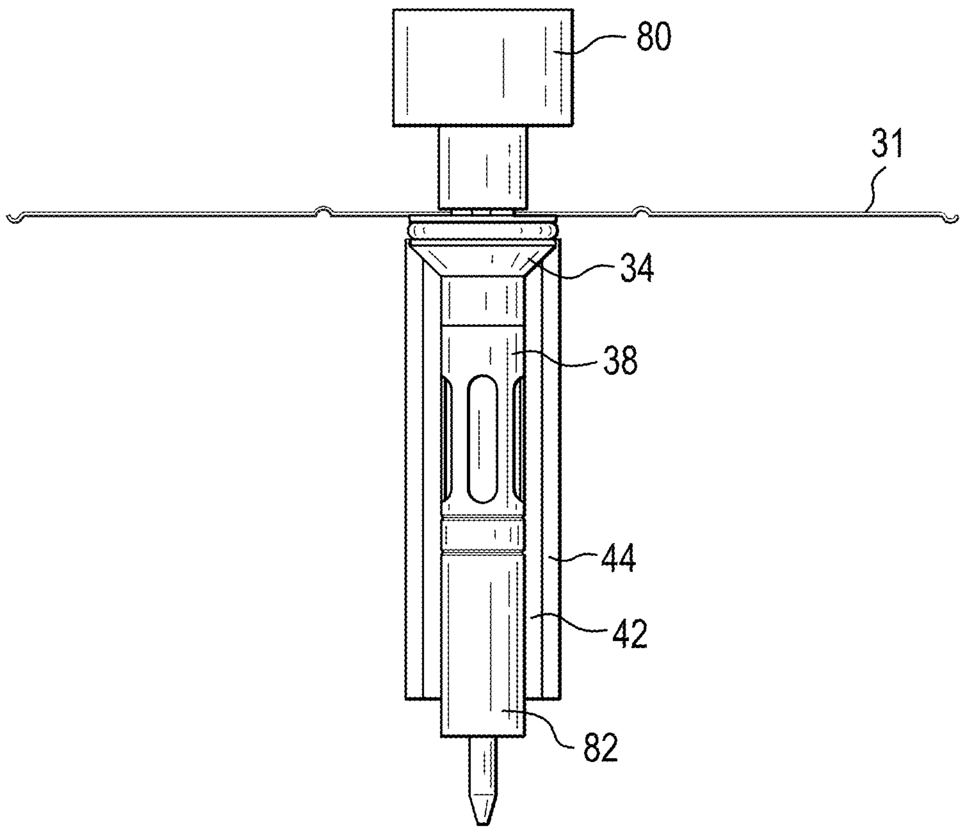

In at least one example embodiment, as shown in FIG. 6F, the method may also include inserting a second mandrel 82 into the heater 36 before or after positioning the chimney cage 38 around the heater 36.

Figure 6G:
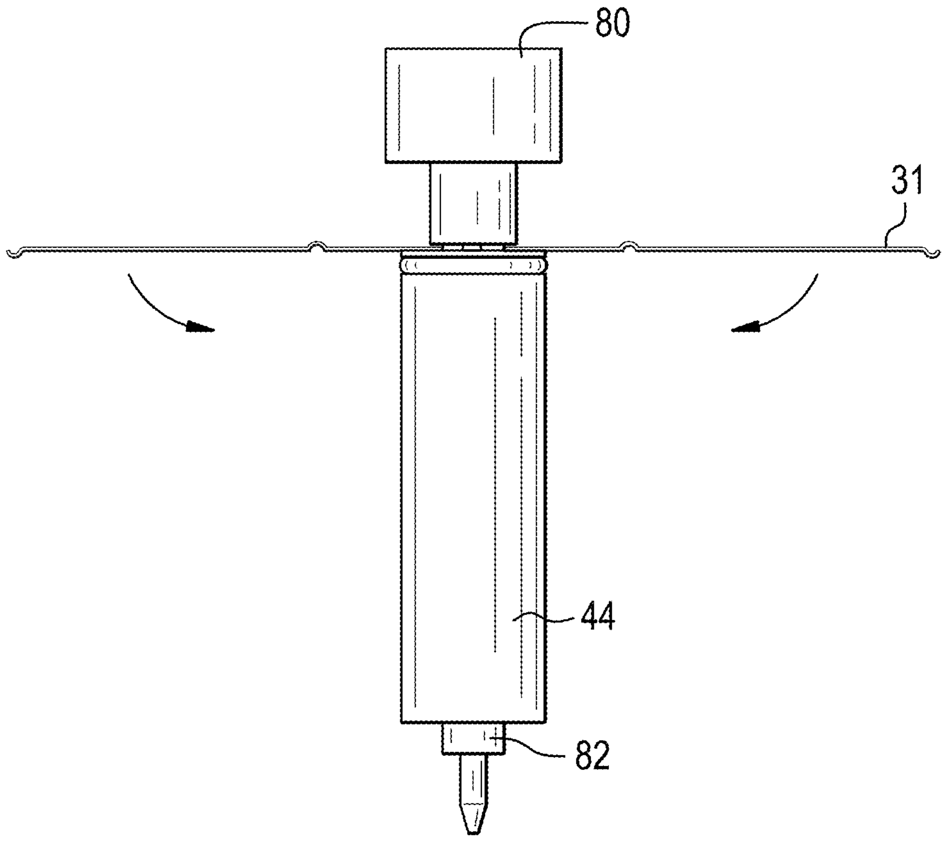
Figure 6H:
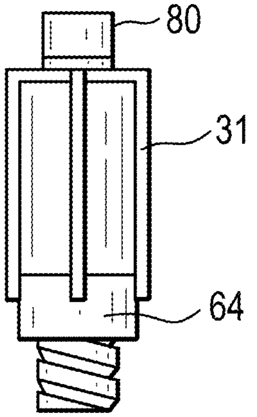
Figure 6I:
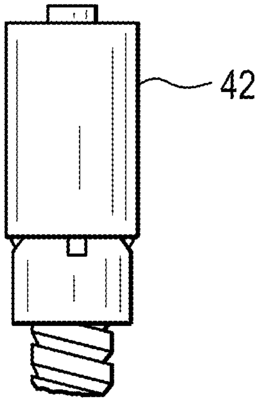
Figure 7A:
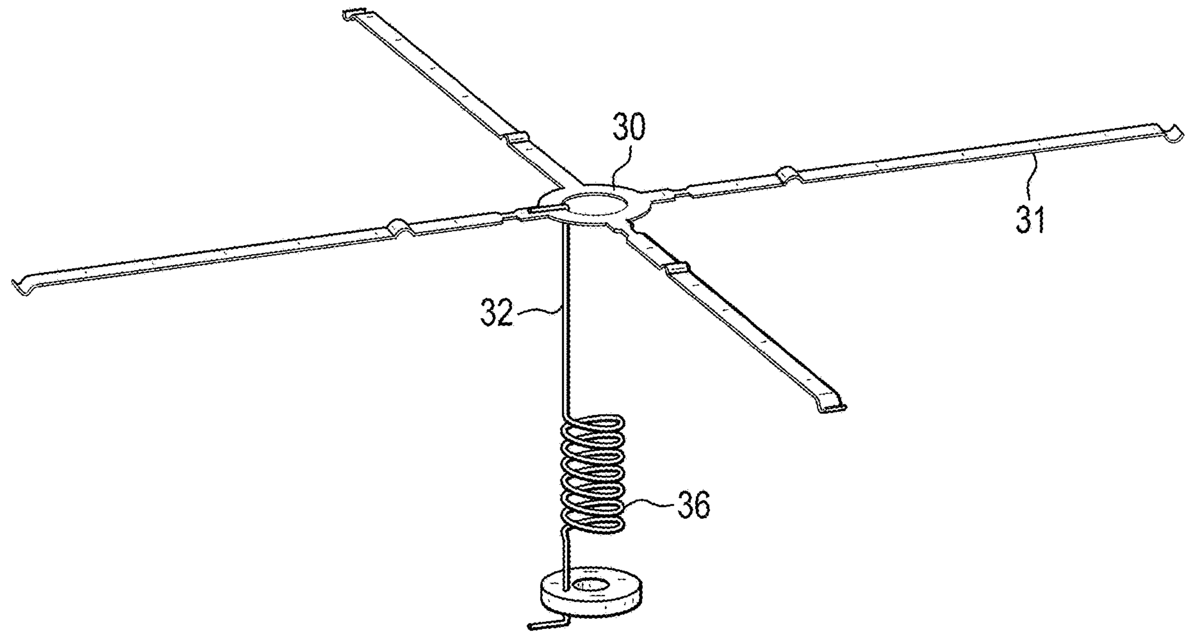
FIGS. 7A-7E illustrate a method of assembling a cartridge including a heater assembly according to at least one example embodiment.
Figure 7B:
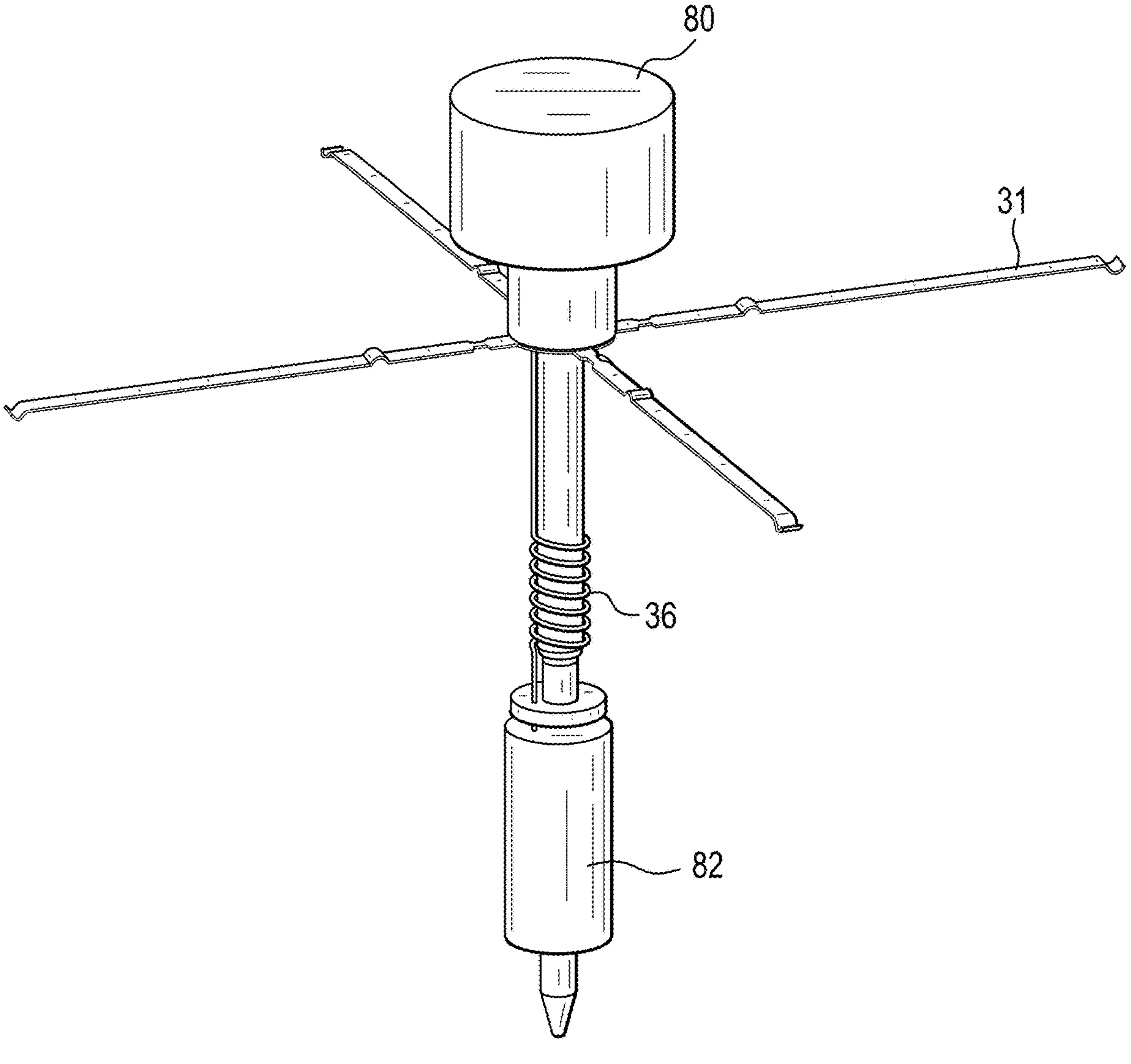
Figure 7C:
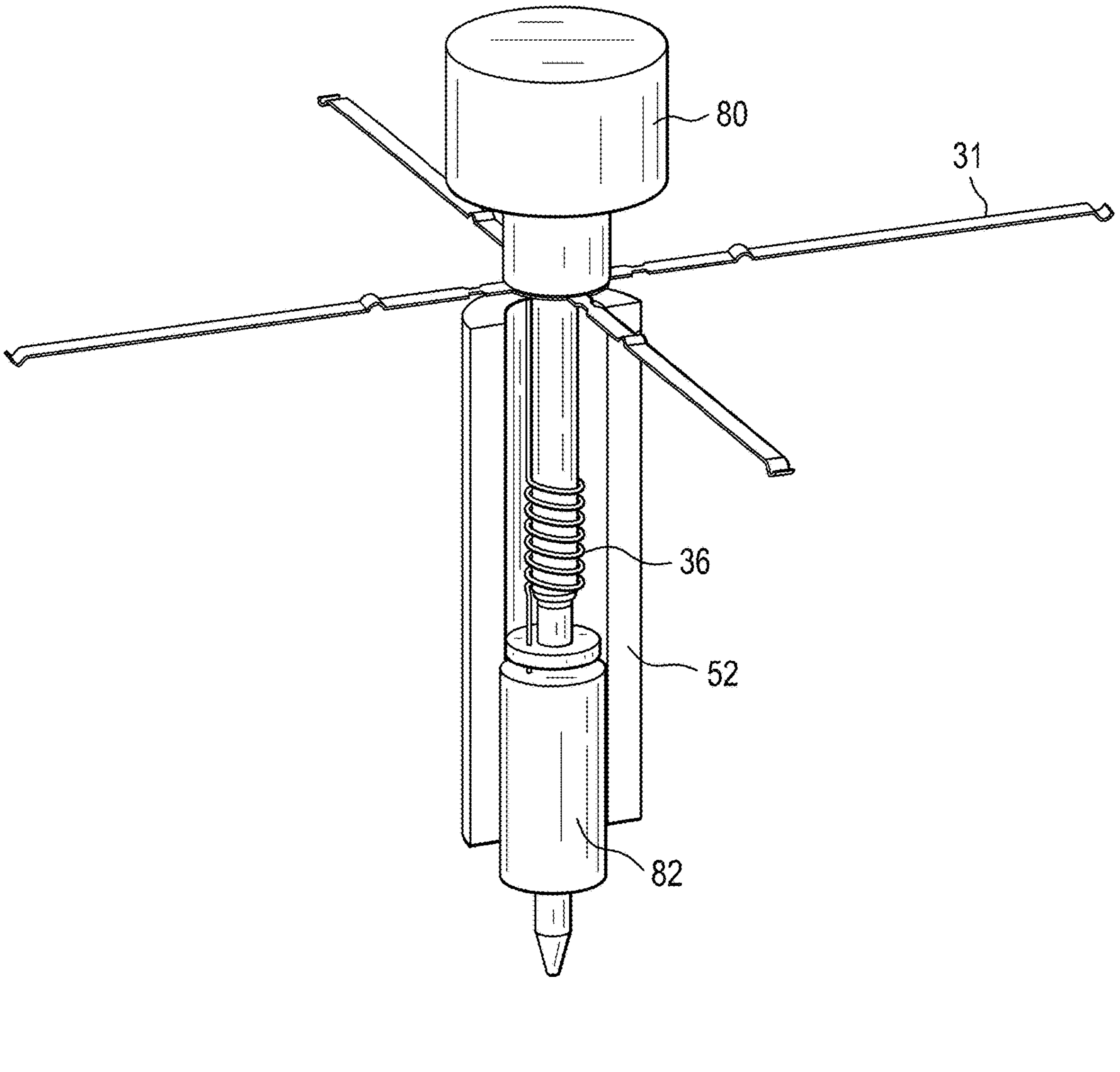
Figure 7D:
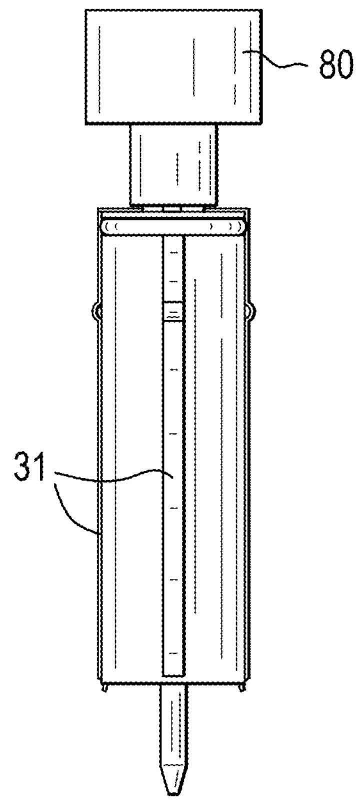
Figure 7E:
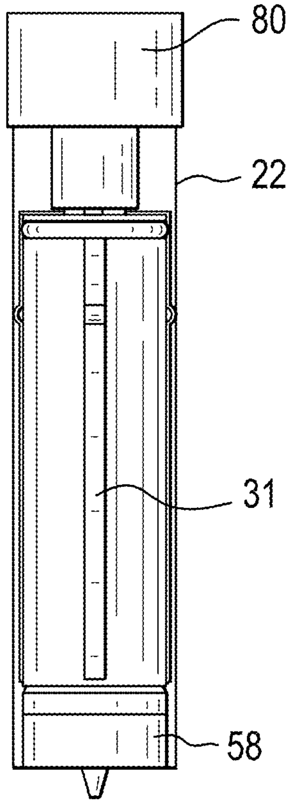

In at least one example embodiment, as shown in FIGS. 6G and 6H, the method may include folding the at least one arm 31, such that the at least one arm 31 extends towards the wrapped heater assembly and/or sliding a housing 22' over the wrapped heater assembly 56. In another example embodiment, the at least one arm 31 is sized and configured to contact an inner surface of the housing 22' without being folded and thus the method need not include the folding step.

In some example embodiments, as shown in FIG. 61, the method may also include wrapping at least one layer of gauze material 42, 44 about the chimney cage 38 of the heater assembly 56 to form a wrapped heater assembly. The method may also include folding the at least one arm 31, such that the at least one arm 31 extends away from the wrapped heater assembly.

In at least one example embodiment, the method may include removing the first mandrel 80, removing the second mandrel 82, and inserting a second connector 58 in a second end of the wrapped heater assembly.

In at least one example embodiment, the method may also include injecting a pre-vapor formulation onto the at least one layer of gauze material 42, 44 after the heater assembly 56 is positioned within the outer housing 22' and the reservoir 122 is established between the chimney cage 38 and the outer housing 22'.

In at least one example embodiment, the method may include inserting a mouth-end insert 8 in a first end of the housing 22' after the mandrel 80 is removed.

In at least one example embodiment, the method may include threading the first electrical lead 32 through a slot 150 in a chimney cage cap 34, positioning the cathode clip 30 on the chimney cage cap 34, and/or welding the first electrical lead 32 to the cathode clip 34. In at least one example embodiment, the electrical lead 32 need not be welded to the cathode clip 34, but maintains contact with the cathode clip 34 due to the positioning of the electrical lead 32 through the slot 150.

In at least one example embodiment, as shown in FIGS. 7A-7E, the method may be substantially the same as in FIGS. 6A-6I, but may include inserting the first mandrel 80 through a first end of the heater 36 instead of wrapping a heater coil around the first mandrel 80.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A heater assembly, comprising,
a chimney cage extending in a longitudinal direction;
a heater within a space defined by the chimney cage;
an outer gauze about an outer circumference of the chimney cage;
a chimney cage cap configured to engage a first end of the chimney cage, the chimney cage cap defining a channel extending longitudinally through the chimney cage cap, at least a portion of an electrical lead extending from the heater and through the channel; and
a cathode clip electrically connected to the electrical lead, the cathode clip including,
a body defining an opening therein, at least a portion of the chimney cage cap within the opening; and
at least one arm extending from the body, the at least one arm extending along an outer surface of the outer gauze.

2. The heater assembly of claim 1, further comprising:
a heater gauze extending about an outer circumference of the heater, the heater gauze in the space of the chimney cage.

3. The heater of claim 1, wherein the at least one arm includes four arms.

4. The heater of claim 1, further comprising:
a gasket surrounding the chimney cage cap.

5. The heater of claim 1, wherein the channel extends through the cathode clip.

6. The heater of claim 1, wherein the heater is a coil heater.

7. The heater of claim 1, wherein the heater includes an iron-chromium alloy.

8. A cartridge of an electronic vaping device, the cartridge comprising:
an outer housing; and
a heater assembly in the outer housing, the heater assembly including,
a chimney cage extending in a longitudinal direction,
a heater within a space defined by the chimney cage,
an outer gauze about an outer circumference of the chimney cage,
a chimney cage cap configured to engage a first end of the chimney cage, the chimney cage cap defining a channel, the channel extending along a longitudinal axis of the chimney cage cap, the channel centered in the space defined by the chimney cage and the channel extending longitudinally through the chimney cage cap, at least a portion of an electrical lead extending from the heater and through the channel, and
a cathode clip electrically connected to the electrical lead, the cathode clip including,
a body defining an opening therein, at least a portion of the chimney cage cap within the opening, and
at least one arm extending from the body, the at least one arm extending along an outer surface of the outer gauze.

9. The cartridge of claim 8, wherein the heater assembly further comprises:
a heater gauze about an outer circumference of the heater, the heater gauze in the space in the chimney cage.

10. The cartridge of claim 8, further comprising:
a reservoir configured to contain a pre-vapor formulation, the reservoir in the outer housing.

11. The heater of claim 8, wherein the at least one arm includes four arms.

12. The heater of claim 8, further comprising:
a gasket surrounding the chimney cage cap.

13. The heater of claim 8, wherein the channel extends through the cathode clip.

14. An electronic vaping device, comprising:
a cartridge including,
an outer housing, and
a heater assembly in the outer housing, the heater assembly including,
a chimney cage extending in a longitudinal direction,
a heater within a space defined by the chimney cage,
an outer gauze about an outer circumference of the chimney cage,
a chimney cage cap configured to engage a first end of the chimney cage, the chimney cage cap defining a channel, the channel extending along a longitudinal axis of the chimney cage cap, the channel centered in the space defined by the chimney cage and the channel extending longitudinally through the chimney cage cap, at least a portion of an electrical lead extending from the heater and through the channel, and
a cathode clip electrically connected to the electrical lead, the cathode clip including,
a body defining an opening therein, at least a portion of the chimney cage cap within the opening, and
at least one arm extending from the body, the at least one arm extending along an outer surface of the outer gauze; and
a battery section connectable to the cartridge.

15. The electronic vaping device of claim 14, wherein the battery section comprises:
a battery;
a sensor; and
a controller configured to control supply of power from the battery to the heater based on output from the sensor.

16. The electronic vaping device of claim 14, wherein the at least one arm is configured to contact the outer housing.

17. The electronic vaping device of claim 14, further comprising:
an anode contacting an end of the heater assembly opposite the cathode clip, the anode extending through an anode gasket, and the anode contacting the electrical lead.

* * * * *